United States Patent
Sumita (10) Patent No.: US 9,559,876 B2
(45) Date of Patent: Jan. 31, 2017

(54) ADAPTIVE EQUALIZATION PROCESSING CIRCUIT AND ADAPTIVE EQUALIZATION PROCESSING METHOD

(71) Applicant: NEC Network and Sensor Systems, Ltd, Fuchu-shi, Tokyo (JP)

(72) Inventor: Noriaki Sumita, Tokyo (JP)

(73) Assignee: NEC NETWORK AND SENSOR SYSTEMS, LTD., Tokyo (JP)

( * ) Notice: Subject to any disclaimer, the term of this patent is extended or adjusted under 35 U.S.C. 154(b) by 0 days.

(21) Appl. No.: 14/889,652

(22) PCT Filed: May 23, 2014

(86) PCT No.: PCT/JP2014/002724
§ 371 (c)(1),
(2) Date: Nov. 6, 2015

(87) PCT Pub. No.: WO2014/192269
PCT Pub. Date: Dec. 4, 2014

(65) Prior Publication Data
US 2016/0127156 A1    May 5, 2016

(30) Foreign Application Priority Data
May 29, 2013    (JP) .................................. 2013-112910

(51) Int. Cl.
*H03H 7/30* (2006.01)
*H04L 25/03* (2006.01)
(Continued)

(52) U.S. Cl.
CPC ... *H04L 25/03057* (2013.01); *H04L 25/03885* (2013.01); *H04L 27/01* (2013.01); *H04L 27/38* (2013.01); *H04L 2025/03745* (2013.01)

(58) Field of Classification Search
CPC .................................................. H04L 25/03057
(Continued)

(56) References Cited

U.S. PATENT DOCUMENTS 5,268,929 A * 12/1993 Hashimoto ....... H04L 25/03133
375/222
5,297,165 A *  3/1994 Ueda ................. H04L 25/03019
375/230
(Continued)

FOREIGN PATENT DOCUMENTS

JP        04-035550 A       2/1992
JP        04-271508 A       9/1992
(Continued)

OTHER PUBLICATIONS

International Search Report for PCT Application No. PCT/JP2014/002724, mailed on Jun. 24, 2014.
(Continued)

*Primary Examiner* — Lihong Yu (57) ABSTRACT

Provided is an adaptive equalization processing circuit with which an adaptive equalization process converges in a stable manner without reducing the transmission efficiency. This adaptive equalization processing circuit is characterized by being equipped with: a demodulation means that demodulates a received signal, and generates and outputs a training signal; an adaptive equalization processing means that uses a tap coefficient (generated using the received signal or the training signal) to perform an adaptive equalization process for removing waveform distortion in the received signal, and then outputs an equalization output signal; and a selection means that selects the training signal when the adaptive equalization processing means is in a non-convergent state, and inputs the training signal to the adaptive equalization processing means.

8 Claims, 5 Drawing Sheets (51) Int. Cl.
*H04L 27/01* (2006.01)
*H04L 27/38* (2006.01)

(58) Field of Classification Search
USPC .......................................................... 375/233
See application file for complete search history.

(56) References Cited

U.S. PATENT DOCUMENTS

| | | | | |
|---|---|---|---|---|
| 5,586,128 | A * | 12/1996 | Chen | H03M 13/41 375/341 |
| 5,692,018 | A * | 11/1997 | Okamoto | H04L 25/03057 375/233 |
| 7,443,914 | B2 | 10/2008 | Azenkot et al. | |
| 2006/0088090 | A1 | 4/2006 | Azenkot et al. | |

FOREIGN PATENT DOCUMENTS

| | | | |
|---|---|---|---|
| JP | 2001-308763 | A | 11/2001 |
| JP | 2004-297536 | A | 10/2004 |
| JP | 2006-074314 | A | 3/2006 |
| JP | 2008-518561 | A | 5/2008 |

OTHER PUBLICATIONS

English translation of Written opinion for PCT Application No. PCT/JP2014/002724.
Japanese Office Action for JP Application No. 2015-519637 mailed on Aug. 30, 2016 with partial English Translation.

* cited by examiner

ADAPTIVE EQUALIZATION PROCESSING CIRCUIT AND ADAPTIVE EQUALIZATION PROCESSING METHOD

This application is a National Stage Entry of PCT/JP2014/002724 filed on May 23, 2014, which claims priority from Japanese Patent Application 2013-112910 filed on May 29, 2013, the contents of all of which are incorporated herein by reference, in their entirety.

TECHNICAL FIELD

The present invention relates to an adaptive equalization processing circuit and an adaptive equalization processing method, in which adaptive equalization processing converges stably.

BACKGROUND ART

In recent years, demand for performing high-speed data communication by wireless has been increasing. In particular, in a mobile environment and a wireless LAN (Local Area Network) environment, a diversity scheme and adaptive equalization processing have become indispensable, because multi-path (multiplexed radio wave propagation) fading occurs there.

Patent Literature 1 discloses an automatic equalizer which performs adaptive equalization processing by the use of an adaptive matched filter (AMF) and a decision feedback equalizer (DFE). The adaptive matched filter symmetrizes the impulse response of a transmission line, by estimating it from a received signal and realizing the inverse characteristic of the estimated impulse response. The decision feedback equalizer estimates inter-symbol interference in the transmission line on the basis of a received signal, and removes waveform distortion due to the inter-symbol interference.

In the automatic equalizer disclosed in Patent Literature 1, the adaptive matched filter and the decision feedback equalizer are connected in cascade. Then, the adaptive matched filter estimates the impulse response of the transmission line on the basis of a received signal. Further, the adaptive matched filter is connected in cascade with the transmission line, as a filter which realizes the inverse characteristic of the estimated impulse response. Thereby, matched signal, from which waveform distortion due to the impulse response of the transmission line is removed, is outputted. Subsequently, from the matched signal, the decision feedback equalizer removes waveform distortion due to inter-symbol interference. The decision feedback equalizer estimates the inter-symbol interference in the transmission line from the matched signal. Then, the decision feedback equalizer removes the inter-symbol interference by removing the temporally advanced interference component by the use of a forward equalizer inside the decision feedback equalizer, and by removing the temporally delayed interference component by the use of a backward equalizer also installed in the inside.

Patent Literature 2 discloses a technology of a diversity type receiver which performs adaptive equalization processing by the use of an adaptive matched filter and a decision feedback equalizer.

The technology disclosed in Patent Literature 2 is one which performs tap coefficient setting at initial start-up, by generating a known preamble signal included in a received signal also at the reception side, and by then using the generated preamble as a preamble for tap coefficient setting for the adaptive matched filter and that for the decision feedback equalizer. In the technology disclosed in Patent Literature 2, a preamble signal having a known waveform included in a received signal and a preamble signal generated at the reception side are used, and thereby, improvement in the stability of convergence of the adaptive equalization processing and reduction in a time to the convergence are conducted. That is, the technology of Patent Literature 2 makes tap coefficients of the adaptive matched filter and those of the decision feedback equalizer converge immediately, on the basis of correlation between the known preamble signal and the preamble signal generated at the reception side. Accordingly, the technology disclosed in Patent Literature 2 secures stability of convergence of the adaptive equalization processing and reduces a time required for the convergence.

CITATION LIST

Patent Literature

[Patent Literature 1] Japanese Patent Application Laid-Open No. H04-271508
[Patent Literature 2] Japanese Patent Application Laid-Open No. 2001-308763

SUMMARY OF INVENTION

Technical Problem

In order to perform adaptive equalization processing normally, it is necessary to make converge both of an adaptive matched filter and a decision feedback equalizer which execute the adaptive equalization processing. "To make an adaptive matched filter converge" means to make converge tap coefficients by which respective tap outputs of a transversal filter constituting the adaptive matched filter are multiplied. "To make a decision feedback equalizer converge" means to make converge tap coefficients by which respective tap outputs of a transversal filter constituting the decision feedback equalizer are multiplied. In order to make the tap coefficients converge, it is desirable that a signal used for generating the tap coefficients has correlation with a received signal.

However, for generating tap coefficients of the adaptive matched filter, the technology disclosed in Patent Literature 1 uses a received signal and a matched signal which is an output from the adaptive matched filter itself. Therefore, when it is applied to a modulation method using both phase modulation and amplitude modulation, such as QAM (Quadrature Amplitude Modulation), for example, the technology disclosed in Patent Literature 1 is more susceptible to the influence of the transmission line than when applied to QPSK (Quadrature Phase Shift Keying) or the like. As a result, in the technology disclosed in Patent Literature 1, the matched signal used for generating tap coefficients of the adaptive matched filter does not become stable, and also the tap coefficients of the adaptive matched filter is less likely to converge.

Further, for generating tap coefficients of the decision feedback equalizer, the technology disclosed in Patent Literature 1 uses an equalization output signal obtained by performing adaptive equalization processing on the matched signal from the adaptive matched filter and an error output signal equivalent to the difference between the equalization output signal and a decision output signal from a decision device inside the decision feedback equalizer. Accordingly, the technology disclosed in Patent Literature 1 has a problem in that, in some multipath fading state, the tap coefficients of the decision feedback equalizer do not converge within a permissible time period or never converge.

In the technology disclosed in Patent Literature 2, a known preamble signal needs to be transmitted from the transmission side. Accordingly, the technology disclosed in Patent Literature 2 has a problem in that the above-described necessity leads to decrease in the transmission efficiency in high-speed data communication where improvement in the transmission efficiency is particularly demanded.

The present invention has been made in view of the above-described problems, and accordingly, the objective of the present invention is to provide an adaptive equalization processing circuit and an adaptive equalization processing method in which adaptive equalization processing converges stably, without causing decrease in the transmission efficiency.

Solution to Problem

An adaptive equalization processing circuit according to the present invention is characterized by that it comprises: a demodulation means which generates a training signal by demodulating a received signal and outputs the training signal; an adaptive equalization processing means which performs adaptive equalization processing to remove waveform distortion of the received signal, by the use of tap coefficients generated using the received signal or the training signal, and thereby outputs an equalization output signal; and a selection means which selects the training signal and inputs it to the adaptive equalization processing means when the adaptive equalization processing means is in an unconverged state.

An adaptive equalization processing method according to the present invention is characterized by that it comprises: generating a training signal by demodulating a received signal and outputting the training signal; performing adaptive equalization processing to remove waveform distortion from the received signal by the use of tap coefficients generated using the received signal or the training signal; and selecting the training signal when the adaptive equalization processing is in an unconverged state, and inputting the selected training signal to the adaptive equalization processing.

Advantageous Effects of Invention

According to the present invention, it is possible to make adaptive equalization processing converge stably without decreasing the transmission efficiency.

DESCRIPTION OF EMBODIMENTS

Hereinafter, exemplary embodiments of the present invention will be described in detail with reference to drawings.

First Exemplary Embodiment

Figure 1:
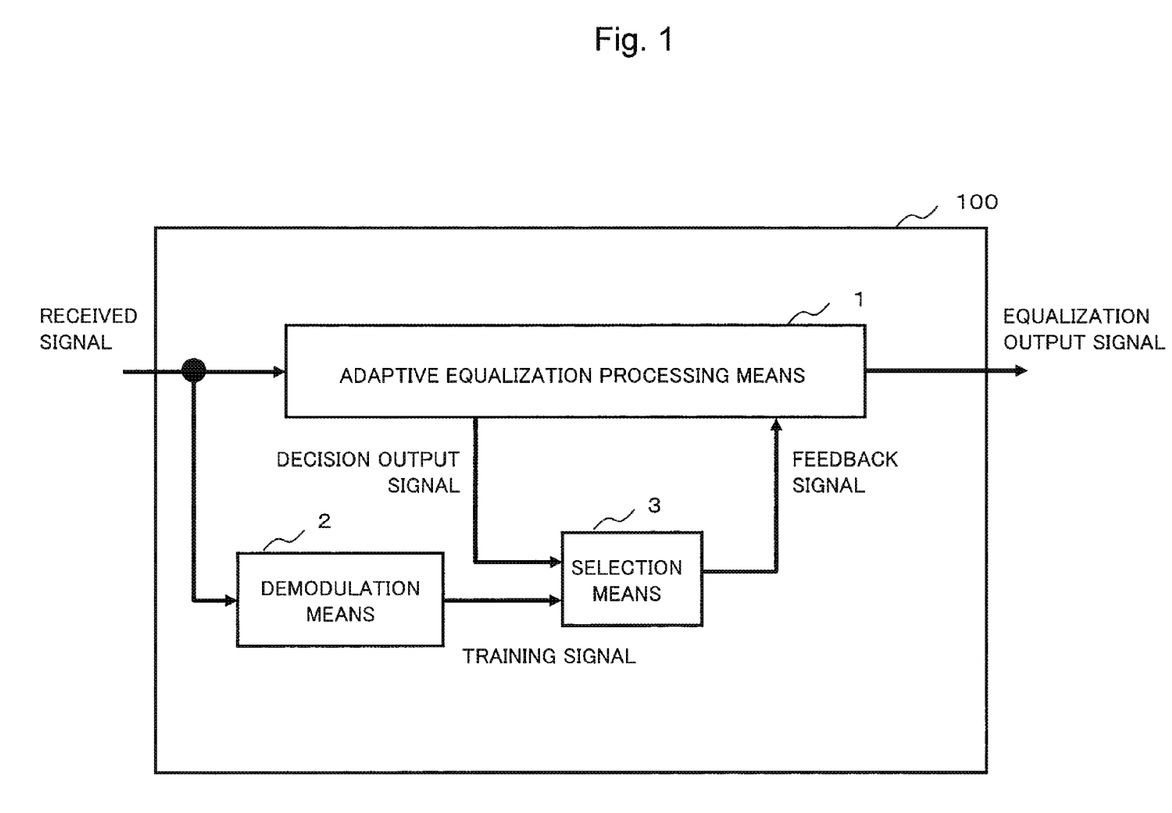
FIG. 1 is a block diagram showing an example of a configuration of an adaptive equalization processing circuit in a first exemplary embodiment of the present invention.

A first exemplary embodiment of the present invention will be described. FIG. 1 is a block diagram showing an example of a configuration of an adaptive equalization processing circuit in the first exemplary embodiment of the present invention.

With reference to FIG. 1, the configuration of the adaptive equalization processing circuit 100 of the present exemplary embodiment will be described. The adaptive equalization processing circuit 100 comprises an adaptive equalization processing means 1, a demodulation means 2 and a selection means 3.

The adaptive equalization processing means 1 performs adaptive equalization processing on a received signal, thus removing its waveform distortion, and thereby outputs an equalization output signal. The received signal is a signal generated by modulating a digital signal by a predetermined method. The received signal is demodulated by "symbol decision" to decide a symbol included in the received signal, and thereby the original digital signal is extracted. Here, waveform distortion occurs in the received signal owing to various causes such as multipath fading. In the present invention, there is no particular limitation on a cause of waveform distortion generation in a received signal to be a processing target.

The demodulation means 2 extracts timing information from the received signal, and outputs a signal which it generates by demodulating the received signal on the basis of the extracted timing information, as a training signal. In the present invention, any optional signal demodulated from a received signal may be used as a training signal.

The selection means 3 selects either of a decision output signal outputted from the adaptive equalization processing means 1 and a training signal outputted from the demodulation means 2, and inputs the selected signal, as a feedback signal, to the adaptive equalization processing means 1. The selection means 3 performs the selection, of either of a decision output signal or a training signal as a feedback signal, on the basis of the situation of convergence of adaptive equalization processing performed by the adaptive equalization processing means 1 at that time. Note that, the adaptive equalization processing and the feedback signal will be described later.

Next, operation of the adaptive equalization processing circuit 100 will be described below.

The adaptive equalization processing means 1 is provided with an adaptive matched filter (AMF) function unit and a decision feedback equalizer (DFE) function unit, for the purpose of removing waveform distortion from a received signal.

Connecting in cascade with the transmission line as a filter which estimates the impulse response of the transmission line from a received signal and realizes the inverse characteristic of the estimated impulse response, the adaptive matched filter function outputs a matched signal equivalent to the received signal from which waveform distortion related to the impulse response of the transmission line has been removed.

The decision feedback equalizer function estimates inter-symbol interference in the transmission line from the matched signal outputted from the adaptive matched filter function, and outputs an equalization output signal equivalent to the matched signal from which waveform distortion due to the estimated inter-symbol interference has been removed.

In order for the adaptive equalization processing means 1 to normally perform adaptive equalization processing, it is necessary to make converge the processing performed by the adaptive matched filter function and decision feedback equalizer function provided in the adaptive equalization processing means 1. In order to make converge the processing performed by the adaptive matched filter function and decision feedback equalizer function, it is required that, for a certain time period, a feedback signal is inputted to each of their tap coefficient generation functions in a manner not to enable a decision error to occur in symbol decision with respect to an input signal to each of the functions.

The demodulation means 2 extracts timing information from a received signal and outputs, as a training signal, a signal generated by demodulating the received signal by the use of the timing information. Because the training signal is generated by demodulating the received signal, it becomes a signal which is synchronized with the received signal in symbol timing and carrier phase.

The selection means 3 decides the situation of convergence of the adaptive equalization processing means 1 on the basis of an error output signal generated by the decision feedback equalizer function of the adaptive equalization processing means 1. For example, when the error output signal is beyond a predetermined threshold value range, the selection means 3 decides that the situation of convergence of the adaptive equalization processing means 1 is in an unconverged state. Detecting that the error output signal is within the predetermined threshold value range, the selection means 3 decides that the situation of convergence of the adaptive equalization processing means 1 is in a converged state.

When the adaptive equalization processing means 1 is in an unconverged state, the selection means 3 selects a training signal from the demodulation means 2 as a feedback signal and inputs it to the adaptive equalization processing means 1.

Because the feedback signal selected by the selection means 3 is a training signal generated from a received signal by demodulating it, there occurs no decision error due to the symbol timing and carrier phase in the symbol decision performed in the adaptive equalization processing means 1. While the training signal synchronized with the received signal is thus inputted as a feedback signal from the selection means 3, there occurs convergence of tap coefficients generated by each of the tap coefficient generation function of the adaptive matched filter function and that of the decision feedback equalizer function, in the adaptive equalization processing means 1, and the adaptive equalization processing accordingly is started.

Specifically, when the adaptive equalization processing means 1 is in an unconverged state, a received signal and a training signal generated by demodulating the received signal are inputted to the tap coefficient generation function of the adaptive matched filter function. The adaptive matched filter function starts estimating the impulse response of the transmission line from the received signal. In this case, because the tap coefficient generation function generates tap coefficients on the basis of the received signal and the training signal synchronized with the received signal, there occurs no timing-related error in the tap coefficient generation process. Accordingly, the tap coefficients converge stably. As a result, on the basis of thus generated tap coefficients, the adaptive matched filter stably starts its function as a filter to estimate the impulse response of the transmission line and be provided with the inverse characteristic of the estimated impulse response. The adaptive matched filter function accordingly starts outputting a matched signal in which waveform distortion relating to the impulse response of the transmission line has been removed.

Also in that case where the adaptive equalization processing means 1 is in the unconverged state, an error output signal and the training signal are inputted to the tap coefficient generation function of the decision feedback equalizer function. The decision feedback equalizer function starts estimating inter-symbol interference in the transmission line on the basis of the matched signal. The received signal, matched signal, error output signal and training signal are signals synchronized with each other. In the tap coefficient generation function, there occurs no timing-related error in the tap coefficient generation process because the error output signal and the training signal are in synchronization with each other. Accordingly, the tap coefficients converge stably. As a result, on the basis of thus generated tap coefficients, the decision feedback equalizer function stably starts its function to estimate inter-symbol interference in the transmission line and remove waveform distortion due to the estimated inter-symbol interference. The decision feedback equalizer function accordingly starts outputting an equalization output signal from which the waveform distortion due to the inter-symbol interference has been removed.

As has been described above, when the adaptive equalization processing means 1 is in an unconverged state, a training signal is fed back to the adaptive equalization processing means 1. Accordingly, on the basis of the training signal, tap coefficients of the adaptive matched filter function and those of the decision feedback equalizer function are generated, where they converge stably.

The selection means 3 detects that the processing in the adaptive equalization processing means 1 has converged, on the basis of the error output signal from the decision feedback equalizer function of the adaptive equalization processing means 1. At this time, the selection means 3 selects a decision output signal from the decision feedback equalizer function of the adaptive equalization processing means 1 as a feedback signal and inputs it to the adaptive equalization processing means 1.

As a result, feedback for performing adaptive equalization processing in the adaptive equalization processing means 1 becomes effective. Accordingly, the adaptive equalization processing means 1 can stably continue the adaptive equalization processing automatically even when distortion of a received signal is large.

Specifically, when the processing in the adaptive equalization processing means 1 has converged, the decision output signal is inputted to the tap coefficient generation function of the adaptive matched filter function. The adaptive matched filter function continues the processing of estimating the impulse response of the transmission line from a received signal. The decision output signal is a signal generated, on the basis of a received signal and a training signal, by removing waveform distortion related to the impulse response of the transmission line, further removing inter-symbol interference in the transmission line, and then performing symbol decision. After the feedback signal has been switched to the decision output signal, the tap coefficient generation function captures and traces change in received signal with reference to the decision output signal, and adaptively generates the tap coefficients. Accordingly, a change in received signal is fed back through thus generated tap coefficients, and as a result, the adaptive matched filter function can continue its function as a filter to estimate the impulse response of the transmission line and be provided with the inverse characteristic of the estimated impulse response. The adaptive matched filter function accordingly continues output of a matched signal from which waveform distortion relevant to the impulse response of the transmission line has been removed.

Also in that case where the processing in the adaptive equalization processing means 1 has converged, the decision output signal is inputted to the tap coefficient generation function of the decision feedback equalizer function. The decision feedback equalizer function continues the processing of estimating inter-symbol interference in the transmission line from a matched signal. When the feedback signal has been switched from the training signal to the decision output signal, the tap coefficient generation function captures and traces change in matched signal resulting from change in received signal as change in error output signal, and adaptively generates the tap coefficients. Because a change in received signal is fed back through thus generated tap coefficients, the decision feedback equalizer function can continue its function to estimate inter-symbol interference in the transmission line from a matched signal and remove waveform distortion due to the inter-symbol interference.

Here, in the tap coefficient generation, used is a decision output signal generated by symbol decision on the signal level of an equalization output signal performed by a decision device. Further, feedback of an error output signal representing a change including an error associated with the symbol decision is performed.

Thus, when the processing by the adaptive equalization processing means 1 has converged, by feeding back a decision output signal to the adaptive equalization processing means 1, generation of the tap coefficients of the adaptive matched filter function and those of the decision feedback equalizer function is started. Accordingly, the adaptive equalization processing means 1 transits from the state where the tap coefficients stably converge to the state where the tap coefficients are generated by feeding back a change in received signal in a manner to trace it. That is, feedback for performing adaptive equalization processing becomes effective.

As has been described above, in the adaptive equalization reception circuit 100 of the present exemplary embodiment, when the processing by the adaptive equalization processing means 1 is in an unconverged state, a training signal generated by demodulating a received signal is fed back to the adaptive equalization processing means 1. As a result, it is possible to make converge well the tap coefficients generated by the tap coefficient generation function of each of the adaptive matched filter function and the decision feedback equalizer function, in the adaptive equalization processing means 1. Thus, convergence of the processing by the adaptive equalization processing means 1 is stably achieved, therefore, start of the adaptive equalization processing is accelerated.

Further, in the adaptive equalization reception circuit 100 of the present exemplary embodiment, there is no necessity of transmitting an additional signal such as a preamble signal on the transmission line. Therefore, according to the present exemplary embodiment, it is possible to make the adaptive equalization processing converge without decreasing the transmission efficiency.

Also according to the present exemplary embodiment, when the processing by the adaptive equalization processing means 1 has converged, the selection means 3 selects a decision output signal from the decision feedback equalizer function and feed it back to the adaptive equalization processing means 1, and thereby the adaptive equalization processing can be continued.

Thus, in the present exemplary embodiment, it is possible to achieve an excellent convergent property for the adaptive equalization processing in an unconverged state, without decreasing the transmission efficiency, and to stably continue the adaptive equalization processing automatically in a converged state even if a received signal suffers a large waveform distortion.

While it has been described, in the present exemplary embodiment, that the situation of convergence of the adaptive equalization processing means is decided on the basis of an error output signal from the decision feedback equalizer function, the decision of whether the situation is in an unconverged state or in a converged state is not limited to the one using the error output signal.

For example, whether the processing by the adaptive equalization processing means is in an unconverged state or in a converged state may be decided after demodulation by a subsequent stage having received an equalization output signal, on the basis of whether or not a known bit string exists at a known timing point. Alternatively, whether the processing by the adaptive equalization processing means is in an unconverged state or in a converged state may be decided on the basis of the number of error bits at a time of performing error correction after demodulation by a subsequent stage having received an equalization output signal. That is, it may be decided that the adaptive equalization processing means is in an unconverged state if error bits are included in a proportion equal to or more than a predetermined one in a signal demodulated from an equalization output signal, and that the adaptive equalization processing means is in a converged state if error bits are included in less than the predetermined proportion.

Even when the selection means decides whether the adaptive equalization processing means is in a converged state or in an unconverged state in the way just described above, the selection means may select a training signal generated by demodulating a received signal by the demodulation means when in an unconverged state, and may select a decision output signal from the adaptive equalization processing means when in a converged state, on the basis of a result of the decision of whether in a converged state or in an unconverged state, similarly to in the present exemplary embodiment.

Second Exemplary Embodiment

Figure 2:
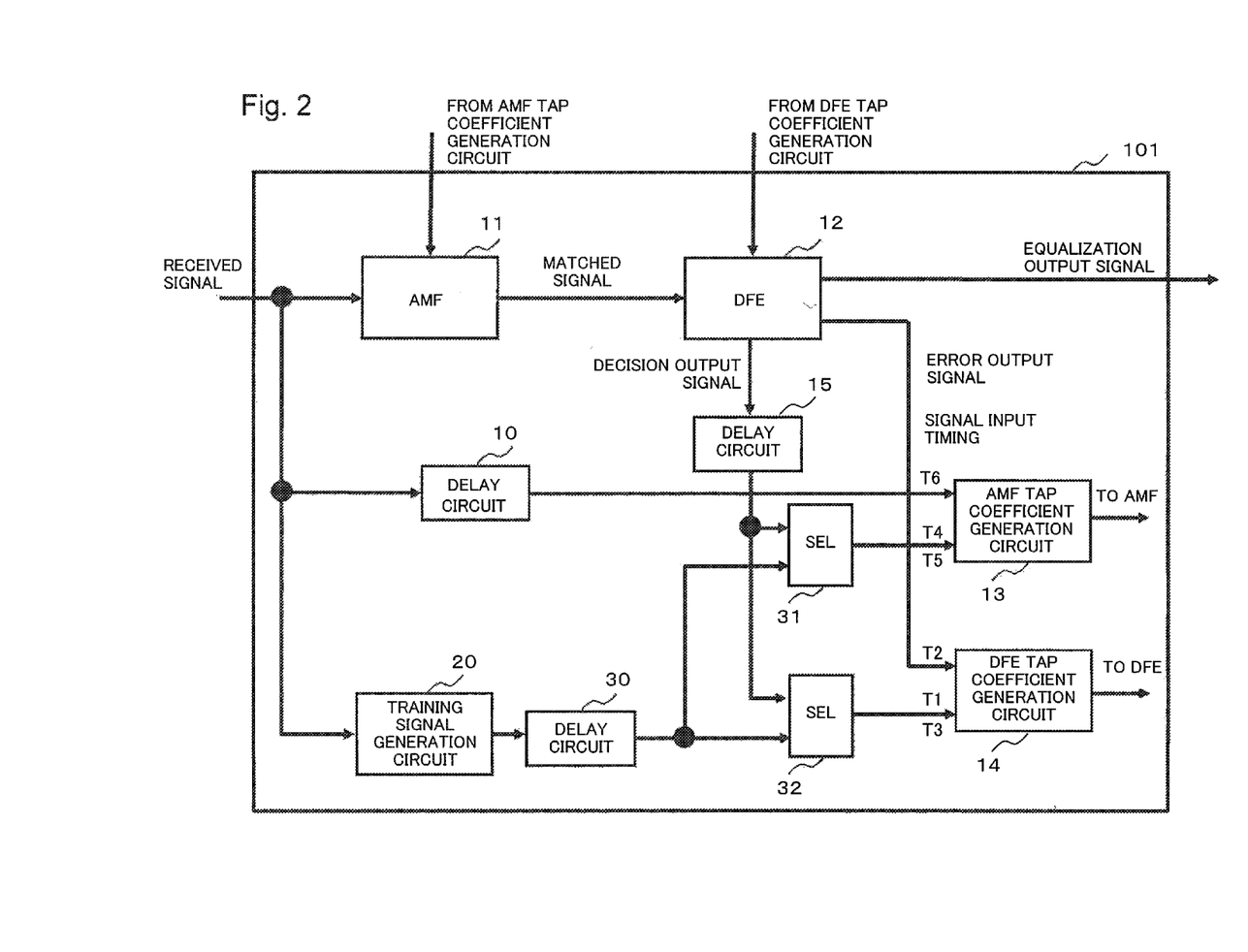
FIG. 2 is a block diagram showing an example of a configuration of an adaptive equalization processing circuit in a second exemplary embodiment of the present invention.
Figure 3:
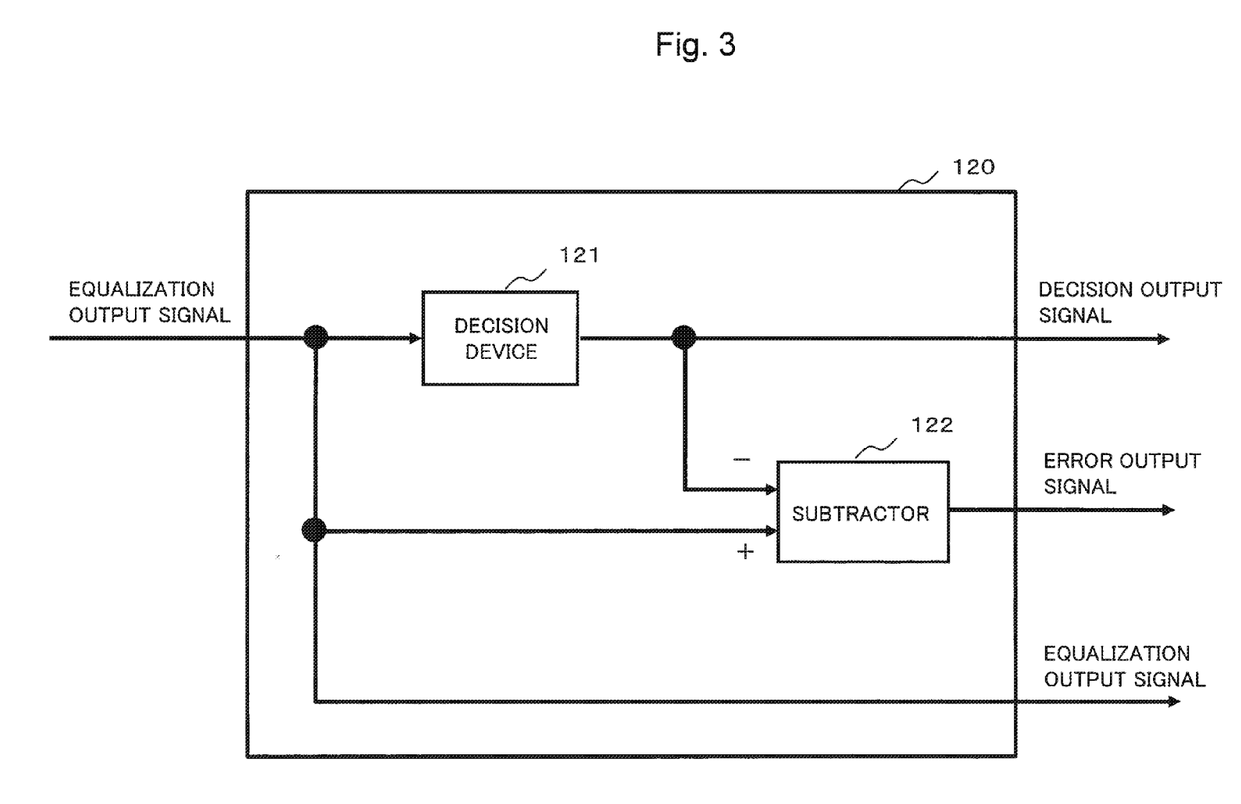
FIG. 3 is a block diagram showing an example of a configuration of an output circuit inside a decision feedback equalizer, of the adaptive equalization processing circuit in the second exemplary embodiment of the present invention.
Figure 4:
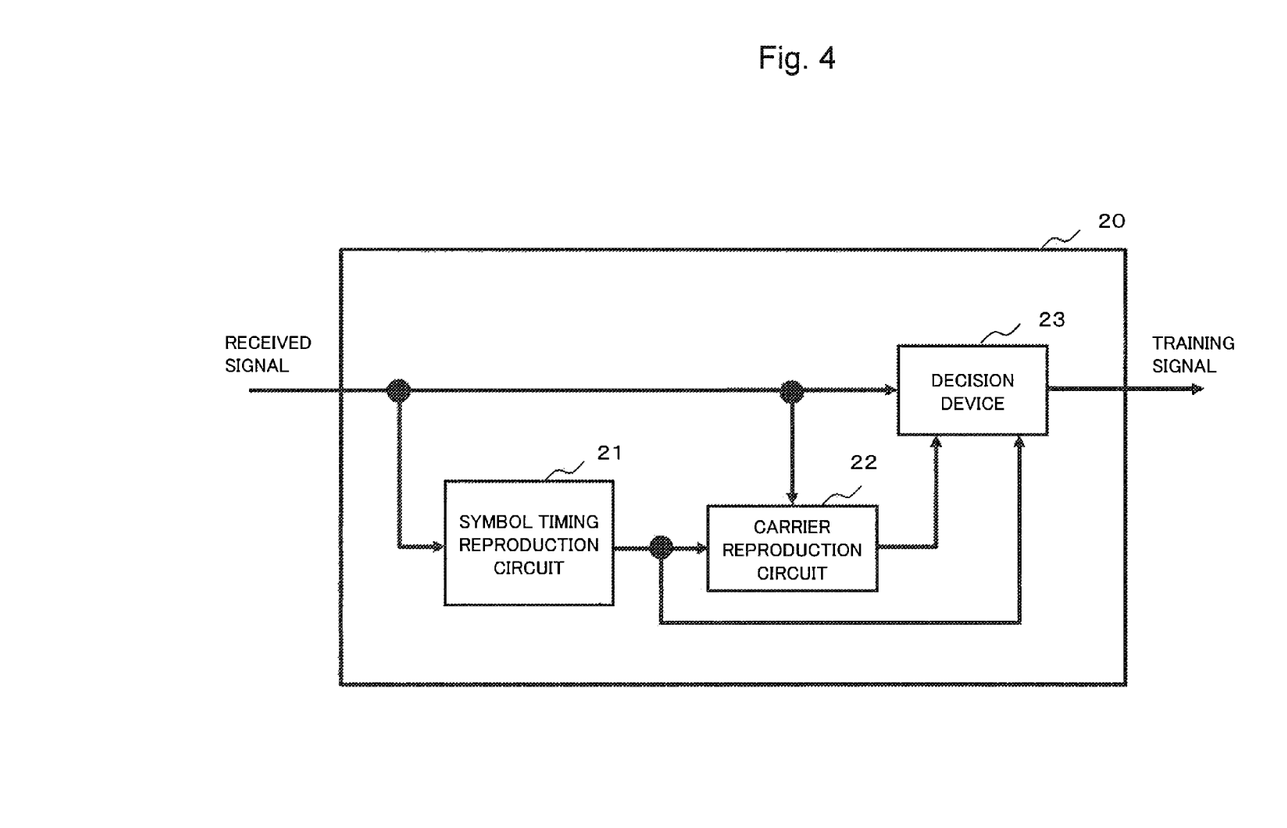
FIG. 4 is a block diagram showing an example of a configuration of a training signal generation circuit of the adaptive equalization processing circuit in the second exemplary embodiment of the present invention.

A second exemplary embodiment of the present invention will be described below. FIG. 2 is a block diagram showing an example of a configuration of an adaptive equalization processing circuit in the second exemplary embodiment of the present invention. FIG. 3 is a block diagram showing an example of a configuration of an output circuit inside a decision feedback equalizer of the adaptive equalization processing circuit in the second exemplary embodiment of the present invention. FIG. 4 is a block diagram showing an example of a configuration of a training signal generation circuit in the second exemplary embodiment of the present invention.

With reference to FIG. 2, the configuration of the adaptive equalization processing circuit 101 of the present exemplary embodiment will be described. The adaptive equalization processing circuit 101 comprises a delay circuit 10, an adaptive matched filter (AMF) 11, a decision feedback equalizer (DFE) 12, a tap coefficient generation circuit 13 for the adaptive matched filter (AMF), a tap coefficient generation circuit 14 for the decision feedback equalizer (DFE), a delay circuit 15, a training signal generation circuit 20, a delay circuit 30, a selection circuit (SEL) 31 and a selection circuit (SEL) 32.

The adaptive matched filter 11 estimates the impulse response of the transmission line from a received signal on the basis of tap coefficients received from the AMF tap coefficient generation circuit 13. Further, the adaptive matched filter 11 is connected in cascade with the transmission line as a filter to realize the inverse characteristic of the estimated impulse response. Accordingly, the adaptive matched filter 11 outputs a matched signal equivalent to the received signal from which waveform distortion related to the impulse response of the transmission line has been removed.

From the matched signal, which is the output from the adaptive matched filter at the preceding stage, the decision feedback equalizer 12 estimates inter-symbol interference in the transmission line on the basis of tap coefficients received from the DFE tap coefficient generation circuit 14, and outputs an equalization output signal generated by removing waveform distortion due to the inter-symbol interference from the matched signal.

FIG. 3 shows a configuration of an output circuit 120 which outputs the equalization output signal, a decision output signal and an error output signal from the decision feedback equalizer 12. With reference to FIG. 3, the output circuit 120 will be described below. The output circuit 120 comprises a decision device 121 and a subtractor 122.

The decision feedback equalizer 12 inputs an equalization output signal from a transversal filter constituting the decision feedback equalizer 12 to the decision device 121 of the output circuit 120, where symbol decision is performed. Specifically, the decision device 121 samples the equalization output signal, decides a symbol for the sampled signal level, and then outputs a decision output signal representing a symbol value of the decision result. The subtractor 122 subtracts the decision output signal from the equalization output signal, and outputs the resultant signal as an error output signal.

Thus, from the matched signal, which is the output from the adaptive matched filter 11 at the preceding stage, the decision feedback equalizer 12 generates and outputs the equalization output signal, the decision output signal and the error output signal.

The training signal generation circuit 20 outputs a training signal generated by demodulating a received signal. A configuration and operation of the training signal generation circuit 20 will be described later.

The delay circuit 10 delays the received signal to be inputted to the AMF tap coefficient generation circuit 13. The delay circuit 15 delays the decision output signal to be inputted to the AMF tap coefficient generation circuit 13 and to the DFE tap coefficient generation circuit 14 via the respective selection circuits 31 and 32. The delay circuit 30 delays the training signal to be inputted to the AMF tap coefficient generation circuit 13 and to the DFE tap coefficient generation circuit 14 via the respective selection circuits 31 and 32.

Delay time settings for the delay circuits 10, 15 and 30 will be described below. Among the delay time settings, the one for the delay circuit 15 is performed first, the one for the delay circuit 30 next, and lastly the one for the delay circuit 10.

In the delay circuit 15, a delay time of the decision output signal is set such that a timing point T1, at which the decision output signal from the decision feedback equalizer 12 is inputted to the DFE tap coefficient generation circuit 14 via the selection circuit 32, becomes the same as a timing point T2 at which the error output signal from the decision feedback equalizer 12 is inputted to the DFE tap coefficient generation circuit 14.

Next, in the delay circuit 30, a delay time of the training signal is set such that a timing point T3, at which the training signal from the training signal generation circuit 20 is inputted to the DFE tap coefficient generation circuit 14 via the selection circuit 32, becomes the same as the timing point T2.

By the delay time setting in the delay circuit 15, the timing points T2 and T1 become the same, and then by the delay time setting in the delay circuit 30, the timing points T2 and T3 become the same. Accordingly, by the delay time settings in the delay circuits 15 and 30, all of the timing points T1, T2 and T3 become the same.

Here, between a route through which the decision output signal is inputted to the DFE tap coefficient generation circuit 14 and a route through which the decision output signal is inputted to the AMF tap coefficient generation circuit 13, there is only a difference in which one of the selection circuits 31 and 32 is included in each of the routes. Therefore, a timing point T4 at which the decision output signal is inputted to the AMF tap coefficient generation circuit 13 via the selection circuit 31 can be regarded as equivalent to the timing point T1.

Here, between a route through which the training signal is inputted to the DFE tap coefficient generation circuit 14 and a route through which the training signal is inputted to the AMF tap coefficient generation circuit 13, there is only a difference in which one of the selection circuits 31 and 32 is included in the route. Therefore, a timing point T5 at which the training signal is inputted to the AMF tap coefficient generation circuit 13 via the selection circuit 31 can be regarded as equivalent to the timing point T3.

Consequently, all of the timing points T1 to T5 become the same by the delay time settings in the delay circuits 15 and 30.

Lastly, in the delay circuit 10, a delay time of the received signal is set such that a timing point T6 at which the received signal is inputted to the AMF tap coefficient generation circuit 13 becomes the same as the timing point T4 or T5.

By the above settings, adjustment of all of the timing points T1 to T6 is completed.

On the basis of the situation of convergence of processing by the adaptive matched filter 11 and the decision feedback equalizer 12, which are in charge of the adaptive equalization processing, the selection circuits 31 and 32 select and output the training signal from the training signal generation circuit 20 when the situation of convergence is in an unconverged state. When the situation of convergence is in a converged state, the selection circuits 31 and 32 select and output the decision output signal from the decision feedback equalizer 12.

The AMF tap coefficient generation circuit 13 generates tap coefficients of the adaptive matched filter 11 on the basis of the received signal whose input timing is adjusted and the signal from the selection circuit 31. On the basis of the received signal and the signal from the selection circuit 31, the AMF tap coefficient generation circuit 13 estimates the impulse response of the transmission line and generates the tap coefficients such that the adaptive matched filter 11 realizes the inverse characteristic of the estimated impulse response.

The DFE tap coefficient generation circuit 14 generates tap coefficients of the decision feedback equalizer 12 on the basis of the error output signal from the decision feedback equalizer 12 and the signal from the selection circuit 32. On the basis of the error output signal and the signal from the selection circuit 32, the DFE tap coefficient generation circuit 14 estimates inter-symbol interference in the transmission line and generates the tap coefficients of the decision feedback equalizer 12 such that waveform distortion due to the inter-symbol interference is removed from an output signal of the adaptive matched filter 11.

For the above-described tap coefficient generations, for example, the LMS (Least Mean Square) algorithm, the RLS (Recursive Least Squares) algorithm and the like are used. In the present invention, there is no restriction on an algorithm used for the tap coefficient generations.

With reference to FIG. 4, a configuration of the training signal generation circuit 20 of the present exemplary embodiment will be described below.

The training signal generation circuit 20 comprises a symbol timing reproduction circuit 21, a carrier reproduction circuit 22 and a decision device 23.

The symbol timing reproduction circuit 21 reproduces symbol timing from a received signal. For example, the symbol timing reproduction circuit 21 extracts symbol timing information by performing envelope detection, zero-crossing detection or the like on the received signal. The carrier reproduction circuit 22 reproduces the carrier signal by performing phase synchronization of the carrier signal by the use of the received signal and the symbol timing information obtained by the symbol timing reproduction circuit 21. The decision device 23 performs decision on the received signal using the symbol timing information and the carrier signal obtained by, respectively, the symbol timing reproduction circuit 21 and the carrier reproduction circuit 22. The decision device 23 samples the received signal on the basis of the timing information and performs symbol decision on thus sampled signal level, and thereby demodulates the received signal. In this way, the decision device 23 outputs a signal generated by demodulating the received signal as a training signal.

With reference to FIGS. 2, 3 and 4, operation of the adaptive equalization processing circuit 101 of the present exemplary embodiment will be described below.

On the basis of the tap coefficients received from the AMF tap coefficient generation circuit 13, the adaptive matched filter 11 estimates the impulse response of the transmission line, realizes the inverse characteristic of the estimated impulse response, and thereby outputs a matched signal equivalent to the received signal from which waveform distortion related to the impulse response of the transmission line has been removed. On the basis of the tap coefficients received from the DFE tap coefficient generation circuit 14, the decision feedback equalizer 12 at the subsequent stage estimates inter-symbol interference in the transmission line from the matched signal, and outputs an equalization output signal equivalent to the matched signal from which waveform distortion due to the inter-symbol interference has been removed.

In order to normally perform the adaptive equalization processing by the adaptive matched filter 11 and the decision feedback equalizer 12, it is necessary to make converge the processing performed by the adaptive matched filter 11 and that by the decision feedback equalizer 12. In order to make converge the processing by the adaptive matched filter 11 and that by the decision feedback equalizer 12, it is required that, for a certain time period, a signal not causing a decision error is inputted to each of the respective tap coefficient generation circuits 13 and 14, The training signal generation circuit 20 extracts timing information from a received signal by means of the symbol timing reproduction circuit 21 and the carrier reproduction circuit 22. On the basis of the timing information, the decision device 23 performs symbol decision on the received signal and then demodulates it. Thus, the decision device 23 outputs the signal generated by the demodulation as a training signal. Because the training signal is generated by demodulating the received signal, it is a signal whose symbol timing and carrier phase are synchronized with the received signal.

When the adaptive matched filter 11 and the decision feedback equalizer 12 in charge of the adaptive equalization processing are in an unconverged state, the selection circuits 31 and 32 each select a training signal from the training signal generation circuit 20 and input it to, respectively, the tap coefficient generation circuits 13 and 14.

The signal selected by the selection circuits 31 and 32 is a training signal generated by demodulating a received signal. Accordingly, in the adaptive equalization processing performed by the adaptive matched filter 11 and the decision feedback equalizer 12, there occurs no decision error related to the symbol timing and carrier phase.

While the training signal synchronized with the received signal is inputted from the selection circuits 31 and 32, the tap coefficients generated by the tap coefficient generation circuit 13 of the adaptive matched filter 11 and those by the tap coefficient generation circuit 14 of the decision feedback equalizer 12 converge, and the adaptive equalization processing is started.

On the basis of an error output signal from the decision feedback equalizer, the selection circuits 31 and 32 detect that the adaptive matched filter 11 and the decision feedback equalizer 12 in charge of the adaptive equalization processing have converged. At this time, the selection circuits 31 and 32 each select a decision output signal from the decision feedback equalizer 12 and input it to the respective tap coefficient generation circuits 13 and 14.

As a result, feedback for performing the adaptive equalization processing, of which the adaptive matched filter 11 and the decision feedback equalizer 12 are in charge, becomes effective. Accordingly, on the basis of the feedback of the tap coefficients generated by the tap coefficient generation circuit 13 and those by the tap coefficient generation circuit 14, respectively, the adaptive matched filter 11 and the decision feedback equalizer 12 can stably continue the adaptive equalization processing automatically even if distortion of a received signal becomes large.

As has been described above, when the adaptive equalization processing is in an unconverged state, the adaptive equalization reception circuit 101 of the present exemplary embodiment uses a training signal generated by demodulating a received signal. Accordingly, in the adaptive equalization reception circuit 101, it is possible to make converge well the tap coefficients generated by the tap coefficient generation circuit 13 of the adaptive matched filter 11 and those by the tap coefficient generation circuit 14 of the decision feedback equalizer 12. Start of the adaptive equalization processing, of which the adaptive matched filter 11 and the decision feedback equalizer 12 are in charge, is accordingly accelerated because convergence of their tap coefficients is stably achieved.

Further, in the adaptive equalization reception circuit 101 of the present exemplary embodiment, there is no necessity of transmitting an additional signal such as a preamble signal on the transmission line. Therefore, in the present exemplary embodiment, it is possible to make the adaptive equalization processing converge without decreasing the transmission efficiency.

Furthermore, in the present exemplary embodiment, when the adaptive equalization processing has converged, a decision output signal from the decision feedback equalizer 12 is inputted to each of the tap coefficient generation circuits 13 and 14 and then fed back to the adaptive matched filter 11 and the decision feedback equalizer 12 in the form of their tap coefficients. As a result, in the present exemplary embodiment, the adaptive equalization processing can be continued stably.

Thus, in the present exemplary embodiment, similarly to the first exemplary embodiment, it is possible to achieve an excellent convergent characteristic for the adaptive equalization processing in an unconverged state, without decreasing the transmission efficiency, and to stably continue the adaptive equalization processing automatically even if a received signal suffers large waveform distortion in a converged state.

While it has been described, in the present exemplary embodiment, that the situation of convergence of the adaptive equalization processing is decided on the basis of an error output signal from the decision feedback equalizer 12, decision of whether the situation is in an unconverged state or in a converged state is not limited to the one using the error output signal.

For example, whether the adaptive equalization processing is in an unconverged state or in a converged state may be decided after demodulation performed by a subsequent stage having received an equalization output signal, on the basis of whether or not a known bit string exists at a known timing point. Alternatively, whether the adaptive equalization processing is in an unconverged state or in a converged state may be decided after demodulation performed by a subsequent stage having received an equalization output signal, on the basis of the number of error bits at a time of performing error correction. That is, it may be decided that the adaptive equalization processing is in an unconverged state if error bits are included in a proportion equal to or more than a predetermined one in a signal demodulated from an equalization output signal, and that the adaptive equalization processing is in a converged state if error bits are included in less than the predetermined proportion.

Even in a case where the selection circuits 31 and 32 decide whether the adaptive equalization processing is in a converged state or in an unconverged state in the way just described above, the selection circuits 31 and 32 may select a training signal generated by demodulating a received signal when in an unconverged state, and may select a decision output signal from the decision feedback equalizer when in a converged state, on the basis of a result of the decision of whether in a converged state or in an unconverged state, similarly to the present exemplary embodiment.

Third Exemplary Embodiment

Figure 5:
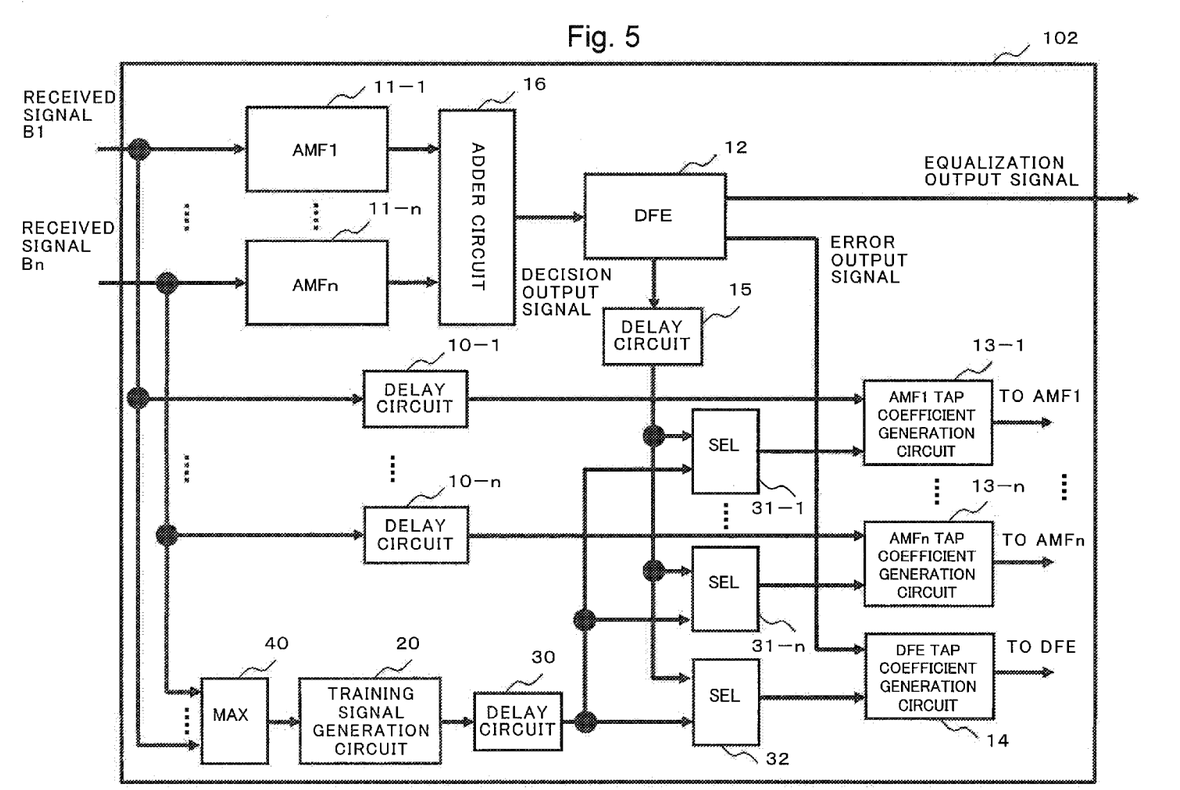
FIG. 5 is a block diagram showing an example of a configuration of an adaptive equalization processing circuit in a third exemplary embodiment of the present invention.

A third exemplary embodiment of the present invention will be described below. FIG. 5 is a block diagram showing an example of a configuration of an adaptive equalization processing circuit in the third exemplary embodiment of the present invention.

An adaptive equalization processing circuit 102 of the third exemplary embodiment shown in FIG. 5 is a diversity type adaptive equalization processing circuit, which is different from the one in the second exemplary embodiment in that it deals with respective received signals from a plurality of branches, and that an adder circuit 16 and a maximum value output circuit (MAX) 40 are added. Accordingly, to the same constituent element as that in the second exemplary embodiment, the same sign as that used in the second exemplary embodiment will be assigned, and its description will be omitted here.

With reference to FIG. 5, the configuration of the adaptive equalization processing circuit 102 of the present exemplary embodiment will be described below.

To the adaptive equalization processing circuit 102, branch-specific received signals B1 to Bn (n is an integer equal to or larger than 2) from a plurality of branches are inputted. Adaptive matched filters 11-1 to 11-*n* respectively deal with the branch-specific received signals B1 to Bn. The adder circuit 16 combines together matched signals which are respective outputs from the adaptive matched filters (AMFs) 11-1 to 11-*n*, and it outputs the combined signal to a decision feedback equalizer (DFE) 12 at the subsequent stage.

Delay circuits 10-1 to 10-*n*, AMF tap coefficient generation circuits 13-1 to 13-*n* and selection circuits 31-1 to 31-*n* deal with the branch-specific received signals B1 to Bn, respectively. The maximum value output circuit 40 outputs a branch-specific received signal Bi (i is an integer in the range from 1 to n) whose reception level value is the largest, among the branch-specific received signals B1 to Bn, to a training signal generation circuit 20 at the subsequent stage.

With reference to FIG. 5, operation of the adaptive equalization processing circuit 102 of the present exemplary embodiment will be described.

The branch-specific received signals B1 to Bn which are received by a diversity method are inputted to respectively corresponding ones of the adaptive matched filters 11-1 to 11-*n*, where adaptive matched filter processing is performed on the inputted signals, and the resultant signals are combined together by the adder circuit 16. The combined signal generated by the adder circuit 16 is inputted to the decision feedback equalizer 12, where waveform distortion due to inter-symbol interference is removed from the combined signal and the resultant signal is outputted as an equalization output signal.

The maximum value output circuit 40 inputs a branch-specific received signal Bi whose reception level value is the largest, among the branch-specific received signals B1 to Bn, to the training signal generation circuit 20. The training signal generation circuit 20 outputs a signal generated by demodulating the branch-specific received signal Bi inputted from the maximum value output circuit 40, as a training signal.

The selection circuits 31-1 to 31-*n* and 32 decide the situation of convergence of the adaptive equalization processing on the basis of an error output signal from the decision feedback equalizer 12.

When the adaptive equalization processing is in an unconverged state, the selection circuits 31-1 to 31-*n* and 32 each select a signal equivalent to the training signal whose timing has been adjusted by a delay circuit 30, and input the selected signal to respective ones of the AMF tap coefficient generation circuits 13-1 to 13-*n* and a DFE tap coefficient generation circuit 14.

Further, the branch-specific received signals B1 to Bn receive timing adjustment performed by the delay circuits 10-1 to 10-*n*, respectively, and then are inputted to respectively corresponding ones of the AMF tap coefficient generation circuits 13-1 to 13-*n*. Each of the AMF tap coefficient generation circuits 31-1 to 31-*n* generates its own tap coefficients on the basis of the training signal selected by the corresponding one of the selection circuits 31-1 to 31-*n* and the corresponding one of the branch-specific received signals B1 to Bn, and inputs the generated tap coefficients to the corresponding one of the adaptive matched filters 11-1 to 11-*n*.

The DFE tap coefficient generation circuit 14 generates tap coefficients on the basis of the training signal selected by the selection circuit 32 and an error output signal from the decision feedback equalizer 12, and inputs the generated tap coefficients to the decision feedback equalizer 12.

Because the signal selected by the selection circuits 31-1 to 31-*n* and 32 is the training signal generated by demodulating the received signal, there occurs no decision error related to the symbol timing and carrier phase in the adaptive equalization processing.

While the training signal synchronized with the received signal is inputted from the selection circuits 31-1 to 31-*n* and 32, tap coefficients generated by each of the tap coefficient generation circuits 13-1 to 13-*n* of the respective adaptive matched filters 11-1 to 11-*n* and those generated by the tap coefficient generation circuit 14 of the decision feedback equalizer 12 converge, and the adaptive equalization processing is started.

On the basis of an error output signal from the decision feedback equalizer 12, the selection circuits 31-1 to 31-*n* and 32 detect that the adaptive equalization processing has converged. At this time, the selection circuits 31-1 to 31-*n* and 32 each select a decision output signal from the decision feedback equalizer 12 and input it to the respective ones of the tap coefficient generation circuits 13-1 to 13-*n* and 14.

As a result, feedback for performing the adaptive equalization processing in the adaptive matched filters 11-1 to 11-*n* and the decision feedback equalizer 12 becomes effective. Accordingly, on the basis of the feedback of the tap coefficients generated by the tap coefficient generation circuits 13-1 to 13-*n* and those by the tap coefficient generation circuit 14, the adaptive matched filters 11-1 to 11-*n* and the decision feedback equalizer 12 can stably continue the adaptive equalization processing automatically even if distortion of a received signal becomes large.

As has been described above, when the adaptive equalization processing is in an unconverged state, the adaptive equalization reception circuit 102 of the present exemplary embodiment uses a training signal generated by demodulating a received signal. Accordingly, in the adaptive equalization reception circuit 102, it is possible to make converge well the tap coefficients generated by each of the tap coefficient generation circuits 13-1 to 13-*n* of the respective adaptive matched filters 11-1 to 11-*n* and those generated by the tap coefficient generation circuit 14 of the decision feedback equalizer 12. In each of the adaptive matched filters 11-1 to 11-*n* and the decision feedback equalizer 12, start of the adaptive equalization processing of which it is in charge is accordingly accelerated because convergence of their tap coefficients is stably achieved as above.

Further, in the adaptive equalization reception circuit 102 of the present exemplary embodiment, there is no necessity of transmitting an additional signal such as a preamble signal on the transmission line. Therefore, in the present exemplary embodiment, it is possible to make the adaptive equalization processing converge without decreasing the transmission efficiency.

Furthermore, in the present exemplary embodiment, when the adaptive equalization processing has converged, a decision output signal from the decision feedback equalizer 12 is inputted to each of the tap coefficient generation circuits 13-1 to 13-*n* and 14 and then fed back to each of the adaptive matched filters 11-1 to 11-*n* and the decision feedback equalizer 12 in the form of their tap coefficients, and thereby, the adaptive equalization processing can be continued stably.

Thus, in the present exemplary embodiment, similarly to the first and second exemplary embodiments, it is possible to achieve an excellent convergent characteristic for the adaptive equalization processing in an unconverged state, without decreasing the transmission efficiency, and to stably continue the adaptive equalization processing automatically even if a received signal suffers large waveform distortion in a converged state.

While it has been described, in the present exemplary embodiment, that the situation of convergence of the adaptive equalization processing is decided on the basis of an error output signal from the decision feedback equalizer 12, decision of whether the situation is in an unconverged state or in a converged state is not limited to the one using the error output signal.

For example, whether the adaptive equalization processing is in an unconverged state or in a converged state may be decided after demodulation performed by a subsequent stage having received an equalization output signal, on the basis of whether or not a known bit string exists at a known timing point. Alternatively, whether the adaptive equalization processing is in an unconverged state or in a converged state may be decided after demodulation performed by a subsequent stage having received an equalization output signal, on the basis of the number of error bits at a time of performing error correction. That is, it may be decided that the adaptive equalization processing is in an unconverged state if error bits are included in a proportion equal to or more than a predetermined one in a signal demodulated from an equalization output signal, and that the adaptive equalization processing is in a converged state if error bits are included in less than the predetermined proportion.

Even in a case where the selection circuits 31-1 to 31-*n* and 32 decide whether the adaptive equalization processing is in a converged state or in an unconverged state in the way just described above, the selection circuits 31-1 to 31-*n* and 32 may select a training signal generated by demodulating a received signal when in an unconverged state, and may select a decision output signal from the decision feedback equalizer 12 when in a converged state, on the basis of a result of the decision of whether in a converged state or in an unconverged state, similarly to in the present exemplary embodiment.

Further, it has been described, in the present exemplary embodiment, that a training signal is generated by using one of branch-specific received signals received from respective ones of a plurality of branches of a diversity method whose reception level value is the largest among the branch-specific received signals. However, it is not necessarily required to use a branch-specific received signal having the largest reception level value.

For example, as a signal used for generating a training signal, one of branch-specific received signals received from respective ones of a plurality of branches whose S/N (Signal to Noise) ratio value is the largest may be detected and used. Alternatively, as a signal for generating a training signal, one of the branch-specific received signals whose bit error rate value before error correction is the largest may be detected and used. As a signal for generating a training signal, one of the branch-specific received signals whose bit error rate value after error correction is the smallest may be detected and used alternatively. Furthermore, as a signal for generating a training signal, one of the branch-specific received signals whose frequency characteristic in a specific frequency range is the flattest may be detected and used alternatively.

Here, in the present exemplary embodiment, the description has been made supposing that the diversity method is a combining diversity. However, the present exemplary embodiment can be applied to even a case where the diversity method is a selection diversity, an equal gain diversity or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the present invention is applicable not only to QAM but also to phase modulation such as QPSK, amplitude modulation, frequency modulation, amplitude phase modulation such as APSK (Amplitude Phase Shift Keying), and any other digital modulation methods.

Further, in the exemplary embodiments of the present invention, the descriptions have been made assuming that signals to be used respectively for generating tap coefficients of the adaptive matched filter and for generating those of the decision feedback equalizer are switched simultaneously, on the basis of decision of whether the adaptive equalization processing is in a converged state or in an unconverged state. However, it is not necessarily required that the switchings of the signals used for generating the tap coefficients are switched simultaneously.

For example, the signal switchings may be performed such that switching of the signal for AMF tap coefficient generation is performed first, and then that of the signal for DFE tap coefficient generation is performed after a delay of a predetermined time period. The signal switchings may be performed in the reverse order.

This application is based upon and claims the benefit of priority from Japanese Patent Application No. 2013-112910, filed on May 29, 2013, the disclosure of which is incorporated herein in its entirety by reference.

REFERENCE SIGNS LIST 1 adaptive equalization processing means
2 demodulation means
3 selection means
10, 10-1, 10-n, 15, 30 delay circuit
11, 11-1, 11-n adaptive matched filter (AMF)
12 decision feedback equalizer (DFE)
13, 13-1, 13-n tap coefficient generation circuit for adaptive matched filter (AMF)
14 tap coefficient generation circuit for decision feedback equalizer (DFE)
16 adder circuit
20 training signal generation circuit
21 symbol timing reproduction circuit
22 carrier reproduction circuit
23, 121 decision device
31, 31-1, 31-n, 32 selection circuit
40 maximum value output circuit
100, 101, 102 adaptive equalization reception circuit
120 output circuit
122 subtractor

What is claimed is:

1. An adaptive equalization processing circuit comprising:
an adaptive equalization processing unit which performs adaptive equalization processing to remove waveform distortion of a received signal, and outputs an equalization output signal;
a tap coefficient generation unit which inputs a feedback signal and generates tap coefficients used in the adaptive equalization processing unit;
a training signal generation unit which extracts timing information from the received signal, demodulates the received signal and outputs a training signal generated by the demodulation which is synchronized with the received signal; and
a selection unit which detects a state of convergence of the adaptive equalization processing unit, selects one of the training signal and a decision output signal of symbol decision on the equalization output signal outputted from the adaptive equalization processing unit depending on the state of the convergence, and outputs the selected signal as the feedback signal to the tap coefficient generation circuit,
wherein,
in response to the state of convergence being in an unconverged state, the selection circuit selects the training signal as the feedback signal, and
in response to the state of convergence being in a converged state, the selection circuit selects the decision output signal as the feedback signal.

2. The adaptive equalization processing circuit according to claim 1, wherein:
the adaptive equalization processing unit includes an adaptive matched filter and a decision feedback equalizer which receives a matched signal from the adaptive matched filter and outputs the equalization output signal;
the decision feedback equalizer performs the symbol decision on the equalization output signal and thereby generates the decision output signal and an error output signal which is a difference between the decision output signal and the equalization output signal; and
the selection unit determines the state of convergence of the adaptive equalization processing unit by whether or not the error output signal is within a predetermined threshold value.

3. The adaptive equalization processing circuit according to claim 2, wherein:
the tap coefficient generation unit comprises,
a first tap coefficient generation circuit which inputs the received signal and the feedback signal, and generates the tap coefficients used in the adaptive matched filter; and
a second tap coefficient generation circuit which inputs the error output signal from the decision feedback equalizer and the feedback signal, and generates the tap coefficients used in the decision feedback equalizer;

the selection unit outputs the selected signal as the feedback signal to each of the first tap coefficient generation circuit and the second tap coefficient generation circuit.

4. The adaptive equalization processing circuit according to claim 2, wherein:

the received signal includes a plurality of branch-specific received signals from respective ones of a plurality of branches of a diversity method, and the adaptive matched filter includes a plurality of adaptive matched filters for respective ones of the plurality of branch-specific received signals; and the training signal generation unit generates the training signal using a branch-specific received signal, among the plurality of branch-specific received signals, which has the highest reception level value, the highest signal to noise ratio value, the lowest bit error rate value, or the flattest frequency characteristic in a predetermined frequency range.

5. The adaptive equalization processing circuit according to claim 1, wherein the adaptive equalization processing unit determines the state of convergence of the adaptive equalization processing unit on the basis of a bit string generated by demodulating the equalization output signal.

6. The adaptive equalization processing circuit according to claim 1, wherein the received signal is a signal in which at least one of an amplitude, frequency and phase is digitally modulated, and the training signal is synchronized with the received signal in symbol timing and carrier phase.

7. An adaptive equalization processing method comprising:

performing adaptive equalization processing to remove waveform distortion from a received signal, by using tap coefficients and outputting an equalization output signal;

generating the tap coefficients used in the adaptive equalization processing by using a feedback signal;

extracting timing information from the received signal, demodulating the received signal and outputting a training signal generated by the demodulation which is synchronized with the received signal;

detecting a state of convergence of the adaptive equalization processing;

selecting one of the training signal and a decision output signal of symbol decision on the equalization output signal outputted from the adaptive equalization processing, depending on the state of convergence; and outputting the selected signal as the feedback signal for generating the tap coefficient, wherein, in response to the state of convergence being in an unconverged state, the training signal is selected as the feedback signal, and in response to the state of convergence being in a converged state, the decision output signal is selected as the feedback signal.

8. An adaptive equalization processing circuit comprising:

an adaptive equalization processing means for performing adaptive equalization processing to remove waveform distortion of a received signal, and for thereby outputting an equalization output signal;

a tap coefficient generation means for inputting a feedback signal, and for generating tap coefficients used in the adaptive equalization processing means;

a training signal generation means for extracting timing information from the received signal, for demodulating the received signal, and for outputting a training signal generated by the demodulation which is synchronized with the received signal; and a selection means for detecting a state of convergence of the adaptive equalization processing means, for selecting one of the training signal and a decision signal of symbol decision on the equalization output signal outputted from the adaptive equalization processing means, depending on the state of convergence, and for outputting the selected signal as the feedback signal to the tap coefficient generation means, wherein, in response to the state of convergence being in an unconverged state, the selection means selects the training signal as the feedback signal, and in response to the state of convergence being in a converged state, the selection means selects the decision output signal as the feedback signal.

* * * * *